Nov. 4, 1958
D. HUTCHINSON
2,858,944
AUTOMOTIVE HOIST
Filed Sept. 6, 1955
3 Sheets-Sheet 1
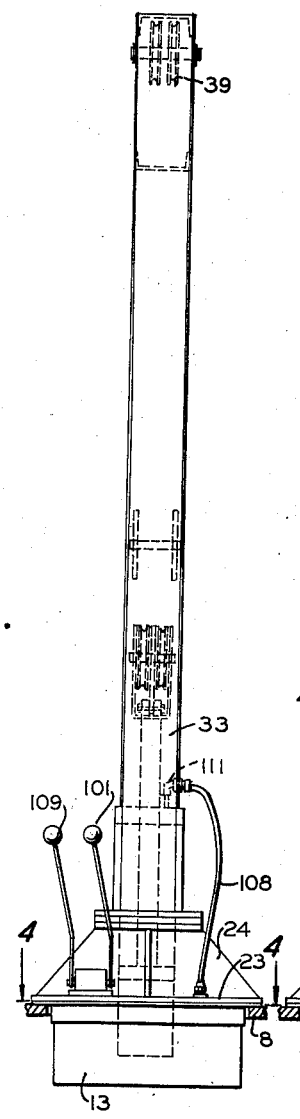
FIG_1
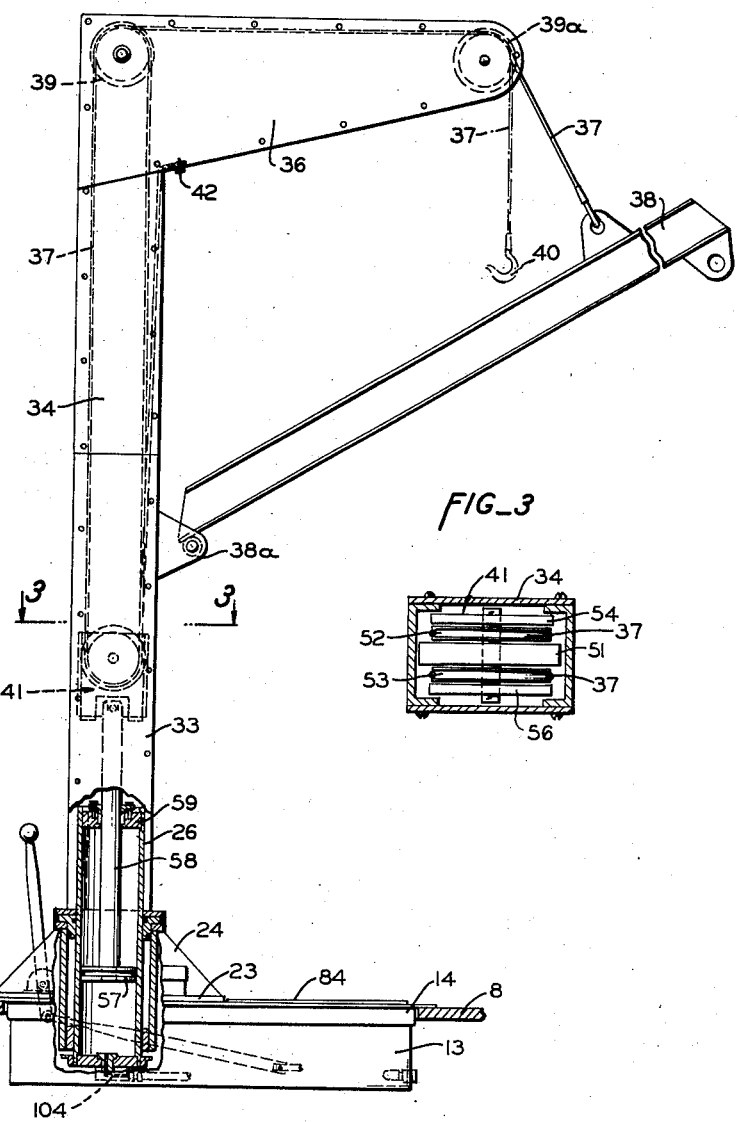
FIG_2
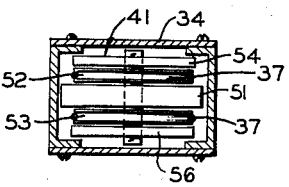
FIG_3
INVENTOR.
DURWOOD HUTCHINSON
BY Lothrop + West
ATTORNEYS Nov. 4, 1958
D. HUTCHINSON
2,858,944
AUTOMOTIVE HOIST
Filed Sept. 6, 1955
3 Sheets-Sheet 2
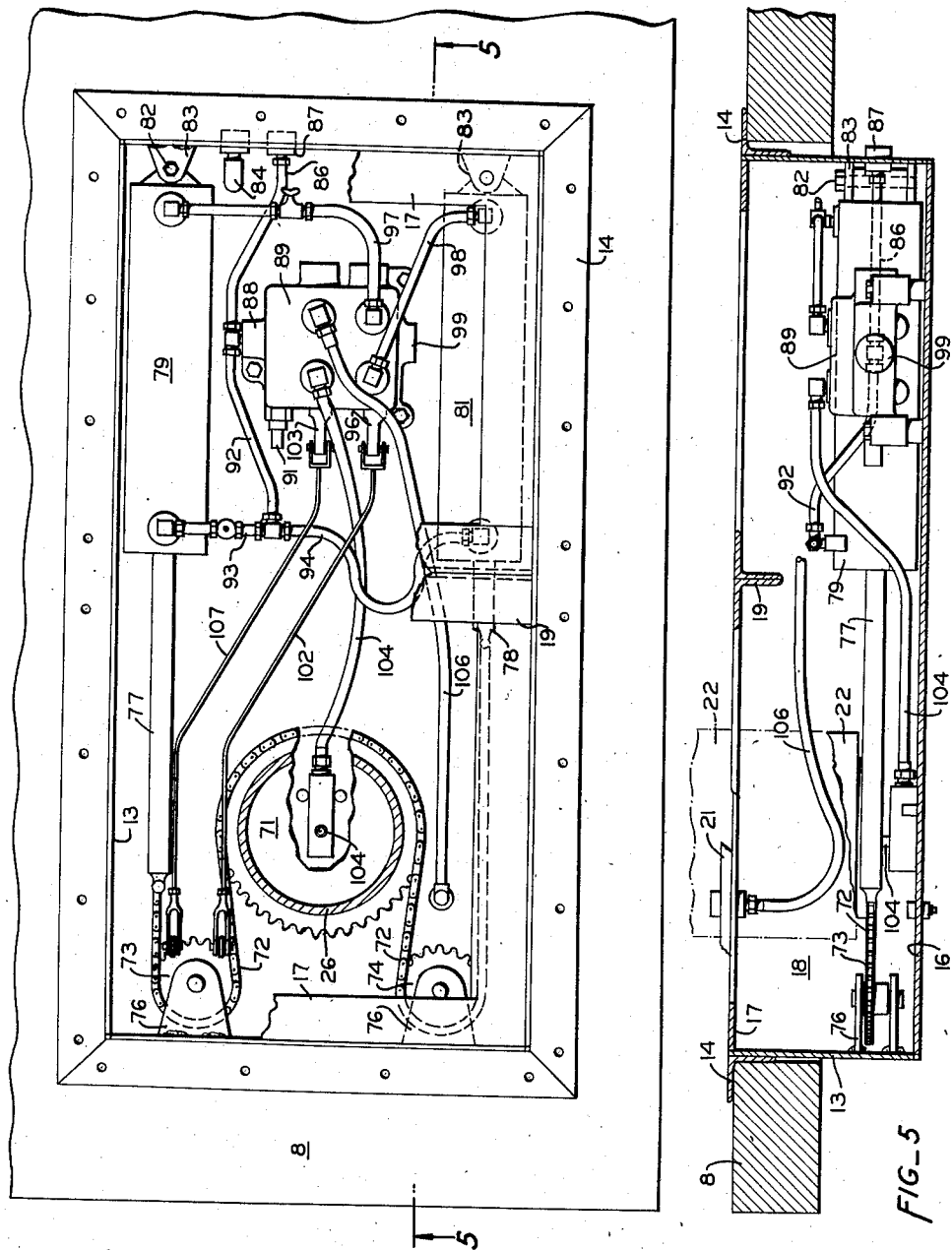
FIG_4
FIG_5
INVENTOR.
DURWOOD HUTCHINSON
BY
Lothrop & West
ATTORNEYS Nov. 4, 1958  D. HUTCHINSON  2,858,944
AUTOMOTIVE HOIST
Filed Sept. 6, 1955 3 Sheets-Sheet 3
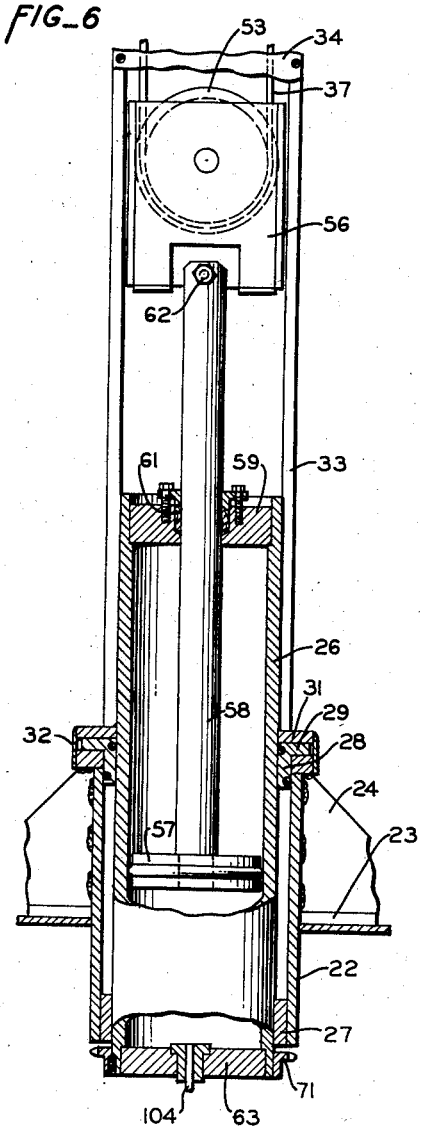
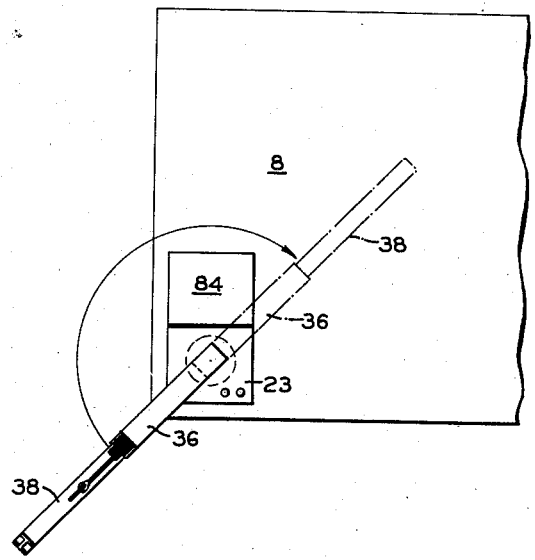
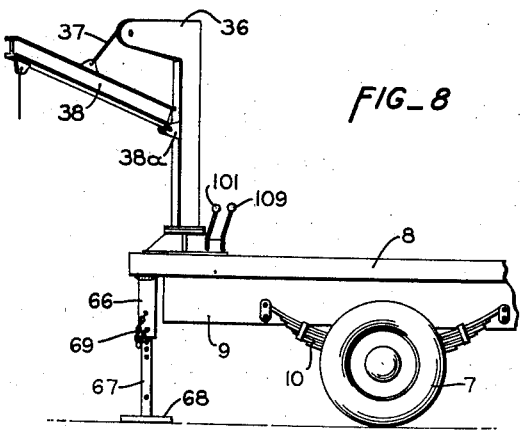
INVENTOR.
DURWOOD HUTCHINSON
BY Lothrop + West
ATTORNEYS

United States Patent Office 2,858,944
Patented Nov. 4, 1958

2,858,944
AUTOMOTIVE HOIST
Durwood Hutchinson, San Pablo, Calif.
Application September 6, 1955, Serial No. 532,470
1 Claim. (Cl. 212—35)

My invention relates to means for assisting in loading and unloading an automotive vehicle such as a truck or trailer. Most trucks and trailers have flat or planar beds loaded over the rear end. When the lading is heavy or bulky it is difficult and time consuming to move the load from the ground to the vehicle bed and to unload the material from the vehicle bed to the ground. The positioning of a vehicle with respect to the spot for loading or unloading is oftentimes quite difficult because of obstructions and surrounding encroachments.

It is therefore an object of my invention to provide a hoist especially suitable for use on automotive vehicles for assisting in the loading and unloading of such vehicles.

Another object of my invention is to provide an automotive hoist operable from the motor power on the vehicle for handling loads in a number of different locations both on and off the vehicle.

Another object of my invention is to provide an automotive hoist in which the various parts perform numerous functions so that the weight and bulk of the equipment is minimized.

Another object of my invention is to provide an automotive hoist which can readily be adapted to vehicles already in use.

Another object of my invention is to provide an automotive hoist of substantially a self-contained nature for easy installation and maintenance.

Other objects, together with the foregoing, are attained in the embodiment of my invention described in the accompanying description and illustrated in the accompanying drawings, in which Figure 1 is a side elevation of an automotive hoist constructed in accordance with my invention.

Figure 2 is an end elevation of the automotive hoist of my invention.

Figure 3 is a fragmentary cross section, the plane of which is indicated by the line 3—3 of Figure 2.

Figure 4 is a plan to an enlarged scale and with the cover plates removed of part of the base housing of my automotive hoist.

Figure 5 is a cross section to the same scale as Figure 4 and showing the Figure 4 structure, the plane of section being indicated by the line 5—5 of Figure 4.

Figure 6 is, for the most part, and to an enlarged scale a diametrical cross section of the main hydraulic cylinder of my automotive hoist.

Figure 7 is a plan of the rear portion of a vehicle showing my automotive hoist installed thereon.

Figure 8 is a side elevation of the structure shown in Figure 7.

While the automotive hoist of my invention can be incorporated in a number of different vehicles and can be embodied in various different forms depending particularly upon the types of load to be handled and the other environmental conditions, it has been successfully incorporated as shown herein for installation on a truck (Figures 7 and 8) having the customary near wheels 7 and a substantially planar or level bed 8. The truck includes the customary frame 9 and suporting springs 10. The power plant of the truck is not shown but is effective to drive the rear wheels 7 in the usual fashion.

Pursuant to the invention, I preferably prepare the truck bed 8 for the installation of my automotive hoist by removing therefrom a rectangular section so that there can be inserted into the truck bed 8 a base housing 13. This is conveniently fabricated of metal plates secured together to form a tight enclosure and having around its upper periphery a mounting angle 14 designed to rest upon the bed 8 of the truck so that the top of the base housing 13 is substantially flush with the truck bed 8. As shown especially in Figure 7, the location of the base housing is conveniently in the rear and right-hand portion of the truck bed so that very little obstruction is afforded the lading. Nevertheless, a firm and secured mount is provided since the housing 13 is sturdily secured to the truck bed 8 or frame.

The base housing has a bottom wall 16 (Figure 5) spaced from the top wall 17 thereof in order to provide an intervening compartment 18. Spanning the base housing about midway between the ends are cross members 19 affording a support for a cover plate 21. This overlies substantially half of the base housing 13 and has an opening to receive a sleeve 22. The sleeve 22 extends from a point above the compartment 18 well down into the compartment and is braced to a cover plate 23 over half of the base housing by means of gussets 24.

Designed to be carried by the sleeve 22 is a hydraulic cylinder 26 disposed with its axis substantially vertical, the cylinder extending down inside the sleeve and being appropriately mounted for rotation relative to the base housing by means of journal rings 27 and 28 of appropriate anti-friction material. So that the cylinder is restrained against axial movement in one direction and so that it can support a substantial weight, the journal ring 28 is provided with a flange 29 against which a flange 31 on the cylinder bears to make a thrust bearing. A protecting cover 32 extends around the outside of the structure. In this fashion, the outer side of the wall 26 of the cylinder is made to serve as a part of a journal for the rotary mounting of the cylinder on the base structure.

In accordance with the invention, the hydraulic cylinder 26 is utilized as a base and support for a mast 33. This preferably is made up of a number of structural shapes covered by removable plates 34. The mast extends substantially vertically above the cylinder 26 and carries a boom 36 of similar construction. Mounted in the mast and within the boom is a suitable cable 37 designed to be connected to an auxiliary boom 38. This is pivoted to the mast by a suitable articulation 38a. If not connected to the auxiliary boom, the cable 37 hangs freely and terminates in a hook 40 for engagement with lading.

In any case, the cable 37 extends over a sheave 39a at the outward end of the boom 36 and then travels over one of a pair of sheaves 39 at the upper end of the mast. The cable extends over a suitable sheave in a travelling block 41, returns around the other of the sheaves 39 bends around a suitable sheave in a block 41 and finally is connected to a suitable anchor 42 on the mast. As the block 41 travels up and down, the tackle is operated and the hook 40 is raised and lowered.

The construction and shape of the travelling block are such that the block occupies substantially the approximately rectangular cross section of the hollow mast 33 so that the mast serves as a loose guide for the traveling sheave block. To this end the sheave block includes a center plate 51 having the sheaves 52 and 53 thereon protected by side plates 54 and 56.

In order to reciprocate the travelling sheave block within the mast and so to operate the tackle, the cylinder 26 is provided with a standard piston 57 mounted on a piston rod 58. This rod extends through a head 59 on the end of the piston and is provided with appropriate packing 61. The upper end of the piston rod 58 is connected by a fastening 62 to the sheave block center plate 51. The other end of the cylinder 26 is closed by a header plate 63. Upon appropriate admission of hydraulic fluid under pressure to the cylinder 26 on one or the other of the opposite sides of the piston 57, the piston is reciprocated axially of the cylinder and the tackle is correspondingly moved.

With this much of the mechanism and with appropriate supply of hydraulic fluid to the cylinder 26, it is possible for an attendant manually to turn the mast 33 in any appropriate direction to dispose the hook 40 or the boom 38 over an article of lading and then hydraulically to control the movement of the hook 40 or the boom 38 so that the article is engaged. When the lading is lifted the attendant can then rotate the mast 33 and correspondingly the boom to position the load over the point of deposit. A reversal of the hydraulic mechanism reverses the motion of the load and places it so that it can be disconnected from the boom or the hook 40. The working arrangement is substantially as shown in Figures 7 and 8 and while in Figure 7, there is shown substantially a rotation of the mast and boom of 180 degrees, this can be made more or less as the circumstances require.

In the event the load is quite heavy so that the motion of the truck vehicle bed 8 due to deflection of the springs 10 and of the tire 7 might be substantial, it is preferred that one corner of the body 8 immediately adjacent and beneath the hoist be supported by a telescoping leg having an upper cylindrical portion 66 and a lower rod 67 with a pad 68 engaging the ground. A fastening 69 holds the parts 66 and 67 in appropriate relationship. This jack or stiff leg is preferably pivotally fastened under the corner of the vehicle bed 8 and is dropped to engage the ground before the load is imposed on the hoist. The deflection of the vehicle bed under load is thus limited.

While the hoist can be rotated by hand, as previously described it is preferred to provide a power rotation thereof since hydraulic mechanism is already afforded for the cylinder 26. For that reason the lower head 63 of the cylinder is enlarged to carry a sprocket 71 around which a chain 72 is trained. The chain extends in opposite directions and passes around sprockets 73 and 74 carried in brackets 76 projecting into the compartment 18. The ends of the chain 72 are connected to the piston rods 77 and 78 of a pair of hydraulic cylinders 79 and 81 mounted appropriately in the compartment 18 by fastening pins 82 engaging brackets 83. All of this part of the structure is preferably carried in the compartment 18. A cover plate 84 closes the half of the compartment not covered by the plate 23 at the base of the mast.

To operate the cylinders 79 and 81 as well as the cylinder 26 there is provided a source of hydraulic fluid under pressure. This preferably includes a force pump (not shown) driven by the vehicle engine. Surplus fluid is withdrawn through an appropriate fitting 84 from the compartment 18 which serves as a reservoir. The pump then discharges liquid under pressure into a conduit 86 within the compartment 18 through an appropriate fitting 87. This pressure fluid is carried into an inlet port 88 of a composite valve body 89 also including a pressure relief valve 91 spilling into the compartment 18. The pressure fluid is also carried through a conduit 92 into branches 93 and 94 leading to the piston rod end of the cylinders 79 and 81 so that a constant stabilizing force is exerted thereon equally. This prevents the mast being inadvertently turned.

Within the valve body 89 there is a valve spool 96 effective to divert pressure fluid from the inlet port 88 into a line 97 leading to the cylinder 79 or into a line 98 leading into the cylinder 81. Whenever one of the lines 97 or 98 is connected to fluid under pressure the other line is connected to a discharge point 99 opening into the compartment 18. Thus when the valve spool 96 is actuated, one of the cylinders 79 is filled with equal pressure liquid on both sides of the piston whereas the other cylinder is provided with a higher pressure on the piston rod end of the cylinder. That effectuates a motion of the piston so that the chain 72 revolves the sprocket 71 and so rotates the cylinder 26 and the mast 23 and the attendant structure. The valve spool 96 which controls this function is under the management of the operator through a hand lever 101 connected by a rod 102 to the spool. Upon appropriate manipulation of the lever 101, the mast and boom can be turned to any location desired. One of the cylinders 79 is effective to turn the structure in one direction and the other cylinder is effective to turn it in the other direction. When the spool 96 is in a central location, there is no flow into or out of either of the cylinders 79 and 81 and the mast and boom are held against rotation.

Much of the hydraulic mechanism is utilized also to operate the cylinder 26. Within the valve body 89, there is provided a secondary spool 103 controlling flow from the inlet 88 alternatively to either one of a pair of conduits 104 and 106 with the other conduit of the pair being connected to the discharge 99 whenever the valve spool 103 is out of neutral position. The spool 103 is controlled through a rod 107 extending to a hand lever 108 in a convenient location for the operator.

The conduit 104 is flexible and extends to a slip or rotary joint fitting disposed on the axis of the cylinder within the lower head 63 so that hydraulic fluid is conducted into and out of the lower end of the cylinder despite rotation thereof. The other conduit 106 extends upwardly through the cover plate 23 to a flexible hose 108 leading into a connection 111 opening into the upper end of the cylinder. Thus, when the operator moves the lever 109, either the upper end of the cylinder or the lower end of the cylinder is provided with fluid under pressure whereas the opposite end is connected to discharge so that the piston rod 58 and its attendant mechanism is reciprocated. In this fashion, the operator by manipulating the levers 101 and 109 has complete control of the lifting and lowering of the hook 40 and of the rotation of the hook throughout its entire range.

All of the power mechanism except possibly the pump for supplying fluid under pressure is contained within the base housing which also serves as a firm mounting for the mast. The mast itself acts as a guide for the sheave block. The hydraulic cylinder which effectuates the lifting and lowering motion serves also as a mounting or base for the mast and boom. The structure is easily mounted on a standard vehicle bed to one side of or in the corner of the bed so that there is substantially no obstruction to loading or unloading. The mechanism is readily accessible by removal of the cover plate. The upper part of the base housing being substantially flush with the vehicle bed serves also as a support for lading or as a continuation for the vehicle bed. The brace or stiff leg prevents undue deflection of the vehicle bed under heavy load. The entire structure affords an advantageous and improved automotive hoist.

What is claimed is:

An automotive hoist comprising a hydraulic cylinder having a lower end portion and an upper end portion, a base housing, a cylindrical journal mounted in fixed position on said housing and encompassing said lower end portion, means forming rotary bearings between said journal and said lower end portion whereby said cylinder can turn, a thrust bearing interrelating said cylinder and said journal to transfer weight from said cylinder to said journal, a vertical mast rectangular in cross-section mounted on and fixed to said upper end portion, tackle vertically movable within said mast including a sheave block, means for constraining said sheave block to turn with said rectangular mast, a piston and piston rod reciprocable within said cylinder, and means connecting said piston rod to said sheave block for reciprocation together and to turn with said cylinder.

References Cited in the file of this patent

UNITED STATES PATENTS

| | | |
|---|---|---|
| 655,321 | Anderson | Aug. 7, 1900 |
| 667,312 | Hetlesaeter | Feb. 5, 1901 |
| 2,446,488 | Pierce | Aug. 3, 1948 |
| 2,489,326 | Rockstrom et al. | Nov. 29, 1949 |
| 2,557,484 | Wagner et al. | June 19, 1951 |
| 2,588,928 | Humpel et al. | Mar. 11, 1952 |
| 2,592,993 | Adams | Apr. 15, 1952 |
| 2,599,991 | Hegre | June 10, 1952 |